Patented Oct. 13, 1931

1,826,720

UNITED STATES PATENT OFFICE

WILHELM BAUER AND LUDWIG ZEH, OF WIESDORF, GERMANY, ASSIGNORS TO GENERAL ANILINE WORKS, INC., OF NEW YORK, N. Y., A CORPORATION OF DELAWARE

SULPHURIC ACID ESTER OF THE LEUCO COMPOUND OF A VAT DYESTUFF

No Drawing. Application filed July 3, 1930, Serial No. 465,783, and in Germany July 29, 1929.

The present invention relates to a water soluble sulphuric acid ester of the leuco compound of a vat dyestuff, more particularly it relates to the sulphuric acid ester of the leuco compound of 4:6-dichloro-6'-methoxy-bis-thionaphthene-indigo, which in its free state has the probable formula

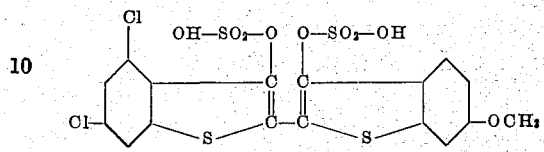

The British Patent No. 186,057 describes a process for the manufacture of stable, water soluble sulphuric acid esters of leuco compounds of vat dyestuffs. The process consists in causing the leuco compounds to react in the presence of a tertiary base with sulphuric acid anhydride or with agents yielding sulphuric acid anhydride, such as chlorosulfonic acid, chlorosulfonic acid methylester and the like.

In accordance with the present invention the particularly valuable ester of the above formula is obtained by applying the said process to the leuco compound of 4:6-dichloro-6'-methoxy-bis-thionaphthene-indigo. The ester thus produced in a very satisfactory yield is, in the form of its alkali metal salts, a stable crystalline substance, easily soluble in water. These salts are distinguished by the fact that, when printed or dyed on textile fibers and developed with acid oxidizing agents, they yield very clear, scarlet shades of a strength and fastness, which have not hitherto been obtainable with sulphuric acid esters of vat dyestuffs.

The following example will further illustrate the invention:—

*Example.*—60 parts by weight of chlorosulfonic acid are introduced with cooling into a mixture of 160 parts by weight of dimethylaniline and 160 parts by weight of chlorobenzene and, after displacing the air by carbon dioxide, 50 parts by weight of dry leuco 4:6-dichloro-6'-methoxy-bis-thionaphthene-indigo are added. The temperature is raised to 60° C. in the course of 2 hours while stirring and maintained at this point for one hour. The reaction mixture is then poured into an excess of sodium carbonate solution, the dimethylaniline and chlorobenzene are driven off by means of steam and the filtered, only slightly colored solution is salted out with a little sodium chloride.

The sodium salt of the ester separates on cooling in the form of a white precipitate consisting of small crystals. It is readily soluble in water. On acidifying with a mineral acid and adding a mild oxidizing agent, the solution immediately deposits a scarlet red precipitate. The ester, when printed or dyed in an appropriate manner on vegetable or animal fibers and developed with oxidizing agents, yields deep scarlet red shades of very good clarity and fastness.

The 4:6-dichloro-6'-methoxy-bis-thionaphthene-indigo can be obtained by condensing a 2-anil of 2:3-diketo-dihydro-6-methoxy-thionaphthene with 4:6-dichloro-3-hydroxythionaphthene or a 2-anil of 4:6-dichloro-3-hydroxythionaphthene with 6-methoxy-3-hydroxythionaphthene.

The 4:6-dichloro-3-hydroxythionaphthene can easily be obtained, for example, by causing the chloride of 3:5-dichlorophenyl-1-thioglycolic acid to react with aluminium chloride.

We claim:

As a new product the sulphuric acid ester of the leuco compound of 4:6-dichloro-6'-methoxy-bis-thionaphthene-indigo, having in its free form the following formula

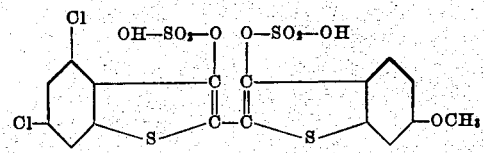

said ester being in the form of its sodium salt a stable, white crystalline substance, readily soluble in water, yielding when printed or dyed on textile fibers and developed with acid oxidizing agents, very clear scarlet shades of good fastness properties.

In testimony whereof, we affix our signatures.

WILHELM BAUER.
LUDWIG ZEH.